United States Patent [19]
Couttenier

[11] Patent Number: 6,030,444
[45] Date of Patent: Feb. 29, 2000

[54] MIXTURE FOR TREATING SILICON-CONTAINING SUBSTRATES

[75] Inventor: Andre Couttenier, Brüssel, Belgium

[73] Assignee: Metallgesellschaft Aktiengesellschaft, Frankfurt/Main, Germany

[21] Appl. No.: 08/817,221

[22] PCT Filed: Sep. 25, 1995

[86] PCT No.: PCT/EP95/03785

§ 371 Date: May 7, 1997

§ 102(e) Date: May 7, 1997

[87] PCT Pub. No.: WO96/09993

PCT Pub. Date: Apr. 4, 1996

[30] Foreign Application Priority Data

Sep. 27, 1994 [BE] Belgium .................................. 9400871

[51] Int. Cl.$^7$ .............. C07G 1/60; C08H 1/00; C09K 1/00
[52] U.S. Cl. .............. 106/287.13; 106/287.14; 106/287.15
[58] Field of Search .................. 106/287.13, 287.14, 106/287.15

[56] References Cited

U.S. PATENT DOCUMENTS 5,595,675  1/1997  Aso et al. .
5,624,481  4/1997  Gerhardinger et al. ............... 106/2
5,728,203  3/1998  Vorse et al. ........................ 106/287.11
5,807,430  9/1998  Zheng et al. ....................... 106/287.11
5,866,352  2/1999  Jackson et al. ................... 106/287.13 X

FOREIGN PATENT DOCUMENTS 0 476 452   3/1992  European Pat. Off. .
06 256 756  9/1994  Japan .

OTHER PUBLICATIONS

"Chemical Abstracts", vol. 115, No. 10, #97863n, Sep. 9, 1991.

"Chemical Abstracts", vol. 107, No. 2, #11806w, Jul. 13, 1987.

*Primary Examiner*—Paul F. Shaver
*Attorney, Agent, or Firm*—Hebert Dubno

[57] ABSTRACT

A mixture is proposed for treating substrates, in particular glass or ceramic material, containing silicon compounds. The proposed mixture consists of the following components: (a) component A, which is formed from at least the polysiloxane with Si—H bonds; (b) component B, which is formed from at least one bi-, tri- or tetrafunctional silane, an alkoxy or $CH_3COO$ rest acting as the functional group; and (c) component C, which is formed from at least one strong, anhydrous organic or inorganic acid. The mixture can be applied to the substrate to particular advantage after being diluted with a solvent.

14 Claims, No Drawings

MIXTURE FOR TREATING SILICON-CONTAINING SUBSTRATES

DESCRIPTION

The invention relates to a mixture for treating substrates containing silicon compounds, in particular glass or ceramic material.

It is known that the surface of substrates containing silicon compounds, preferably silica or silicates, is treated with mixtures which in turn have organosilicon compounds as main constituent. The purpose of these known methods of treatment is, for instance, to reduce the corrosion caused by alkaline detergents or by the atmosphere on articles made of glass, to reduce the abrasion of labels adhered onto glass bottles, or to restrict the soiling of glass and ceramic surfaces.

From the EP-PS 0 395 077 there is known a means for the treatment of glass containers, which consists of 100 parts by weight of an organopolysiloxane and of 100 to 1000 parts by weight of a volatile polydimethyl siloxane. In addition to methyl groups, the organopolysiloxane contains substituted or unsubstituted monovalent hydrocarbon groups or a hydrogen atom as well as a hydroxyl group or a hydrolyzable group. The polydimethyl siloxane has a chain-like or ring-shaped structure. The known means may in addition comprise a curing catalyst. As curing catalyst there are used amines, metal salts of carboxylic acids, organotin compounds, titanic acid esters and quaternary ammonium salts. The organopolysiloxanes are obtained through partial hydrolysis and condensation of alkoxy silanes, where hydrolysis and condensation take place in the presence of water and acids. With the known means, glass containers and the labels provided on the glass containers should be protected against the corrosive attack of detergents.

From the GB-A 1,344,661 there is known a mixture for the treatment of glass and ceramic surfaces, which consists of an alkyl polysiloxane, an acid and ethanol or isopropyl alcohol. Upon application of the mixture and evaporation of the solvent, a liquid, oily residue remains on the glass and ceramic surface, which is, however, only short-lived. This oily residue should protect the glass and ceramic surface against corrosion and soiling.

It is the object underlying the invention to create a mixture for permanently protecting substrates containing silicon compounds, in particular glass or ceramic material, against soiling and corrosion. The mixture should thus form a thin and dense layer on the substrates, which layer has a good adhesion on the substrates and in addition has a good mechanical abrasion resistance. Moreover, the layer formed from the mixture should provide the glass and ceramic surface with hydrophobic properties.

The object underlying the invention is solved by creating a mixture which consists of the following components:

a) of component A, which is formed by at least one polysiloxane, which contains Si—H-bonds and has the general formula:

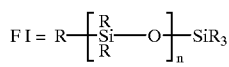

or

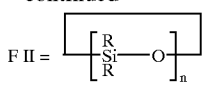

where R is an alkyl residue with 1 to 12 carbon atoms and/or a non-substituted or substituted phenyl residue, where the residues R have in part been replaced by hydrogen, and where n in formula F I is a number from 2 to 50 and in formula F II a number from 4 to 50, b) of component B, which is formed by at least one bi-, tri- or tetra-functional silane, which has the general formula

where R' is a non-substituted or substituted alkyl residue with 1 to 12 carbon atoms, a cycloalkyl residue with 5 to 6 carbon atoms, a non-substituted or substituted phenyl residue and/or a vinyl residue, where R" is an alkoxy residue or a $CH_3COO$-residue and acts as functional residue, where the alkyl moiety of the alkoxy residue has 1 to 12 carbon atoms, and z is a number from 0 to 2, and c) of component C, which is formed by at least one strong, anhydrous organic or inorganic acid.

The mixture is preferably made of the liquid components A, B and C at temperatures up to 80° C. by stirring. The mixture should preferably be stored at low temperatures, as this will increase its long-term stability. The mixture can be applied to the substrate to particular advantage after being diluted with a solvent; it can, however, also be applied solventfree, e.g. by spraying/injecting it under pressure onto the substrate.

In accordance with a further aspect of the invention the mixture contains as bifunctional silane a dialkyl dialkoxysilane, a dicycloalkyl dialkoxysilane, a diphenyl dialkoxysilane, a dialkyl diacetoxysilane, dicycloalkyl diacetoxysilane, a diphenyl diacetoxysilane, a vinyl methyl dialkoxysilane or a vinyl methyl diacetoxysilane.

In accordance with the invention it has turned out to be particularly advantageous when part of the bifunctional silane in the mixture has been replaced by a disiloxane, which has the general formula

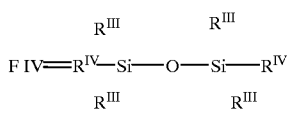

where $R^{III}$ is an alkyl residue with 1 to 12 carbon atoms, where $R^{IV}$ is an alkoxy residue, and where the alkyl moiety of the alkoxy residue has 1 to 12 carbon atoms.

In accordance with a further aspect of the invention the mixture contains as trifunctional silane a monoalkyl trialkoxysilane, a monocycloalkyl trialkoxysilane, a monophenyl trialkoxysilane, a monoalkyl triacetoxysilane, a monocycloalkyl triacetoxysilane, a monophenyl triacetoxysilane, a vinyl trialkoxysilane, a vinyl triacetoxy silane, or a fluoroalkyl trialkoxysilane.

In accordance with a further aspect of the invention the mixture contains as tetrafunctional silane a silicic acid ester of the general formula

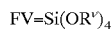

where $R^V$ is an alkyl residue with 1 to 12 carbon atoms.

The bifunctional silanes act as chain extenders or they link chains, whereas the trifunctional and tetrafunctional silanes effect a spatial cross-linkage of the chains. In the final analysis, the silanes are responsible for the fact that a cured resin results from the inventive mixture after the same has been applied onto the substrate. The reactions taking place during the formation of the resin will be explained later.

In accordance with the invention it is particularly advantageous when the mixture contains as polysiloxane a linear polysiloxane with a relative molar mass of 350 to 15,000. Such a siloxane provides the layers formed from the inventive mixture with a good elasticity and a high abrasion resistance.

In accordance with a further aspect of the invention the mixture contains as acid chlorosulfuric acid, benzenesulfonic acid, p-toluenesulfonic acid or trichloroacetic acid, where it is advantageous when the mixture contains 5 to 7 wt-% chlorosulfuric acid or 10 to 12 wt-% trichloroacetic acid. By means of the acids, a very uniform formation of the resin can be achieved.

For the case that the inventive mixture contains a silane with one or more vinyl residues, it is particularly advantageous when $FeCl_3$, $ZnCl_2$, $PtCl_6$ or $SnCl_4$ are added to the mixture in an amount of 0.0005 to 0.01 wt-%. These anhydrous substances act as polymerization catalysts and promote the formation of a resin structure.

In some cases it turned out to be advantageous when the inventive mixture contains 2 to 4 wt-% of a lower alcohol, preferably isopropanol. This improves the handling of the mixture (reduction of viscosity), without leading to a premature alcoholysis of the Si—H-bonds. The lower alcohols contain 1 to 4 carbon atoms.

In accordance with the invention it is finally provided that the mixture contains a solvent, which consists of at least one nonpolar, liquid hydrocarbon and/or at least one ester. By adding the solvent, the application of thin layers onto a substrate is promoted. The dilute, solvent-containing mixture in accordance with the invention is completely stable when it is stored for several months at room temperature. It can be used according to known methods for applying thin layers (e.g. spraying, dipping). Before applying the mixture dissolved in a solvent, the surface of the substrate should be cleaned.

Suitable solvents are in particular methyl, ethyl, or butyl acetate, n-heptane, isooctane, cyclohexane, pentane, toluene and xylene, as well as mixtures of these substances, as they exhibit an inert behaviour with respect to the actual reactants.

In accordance with the invention it is particularly advantageous when for 1 part by weight the mixture contains 5 to 60 parts by weight of the solvent. In this dilution, thin layers can be formed from the mixture on the substrate through coating or dipping.

In accordance with the invention it is particularly advantageous when for 1 part by weight the mixture contains 90 to 100 parts by weight of the solvent. In this dilution, thin layers can be formed from the mixture by spraying them onto the substrate.

During the production and processing of the mixture, the following reactions take place. While mixing the components A, B and C, the action of component C in particular leads to the breakdown of the cyclic polysiloxanes and in addition on a small scale to a hydrolysis of Si—H-bonds of the polysiloxanes by forming Si—OH-groups. The hydrolysis is effected by the water which is present in trace amounts in the mixing apparatus and in the chemicals. Upon dilution of the mixture with the solvent and application of the dilute mixture onto the substrate, the solvent evaporates, and at the same time a resin is formed from components A and B, which resin cures with advancing polymerization and crosslinkage of the components, and is in addition anchored on the substrate by forming Si—O—Si-bonds. Under the influence of component C, Si—H-bonds of component A are hydrolysed by the water present in the atmosphere and adsorbed or bound on the surface of the substrate by forming hydrogen and Si—OH-groups, which under the influence of component C in turn react with the functional alkoxy or $CH_3COO$ residues of component B by forming alcohols or acetic acid, where components A and B are linked with each other by Si—O—Si-bonds and are spatially crosslinked with each other over the surface. It is not necessary to additionally supply water to the reaction system, as the water present in the atmosphere and on the substrate surface is enough for a sufficient hydrolysis of Si—H-bonds. The formation of Si—O—Si-bonds between the resin and the substrate is effected under the influence of component C through condensation between hydrolysed Si—H-bonds and the Si—OH-groups of the substrate by forming water, which is available for hydrolysis. Component C, the alcohols formed as well as the acetic acid formed and reactants not bound in the resin as well as by-products can be rinsed off the layer upon drying and curing the resin with water, to which there is possibly added a cross-linking agent and/or an alkali hydroxide.

The subject-matter of the invention will subsequently be explained in detail with reference to examples.

EXAMPLE 1

A mixture of 200 g hydrogen methyl polysiloxane with a relative molar mass of 2000, 150 g phenyl trimethoxysilane, 50 g dimethyl diethoxysilane and 200 g octyl triethoxysilane is mixed with 52 g trichloroacetic acid. The mixture is heated to 60 to 65° C. under constant stirring, and is held at this temperature for about 15 minutes. Heating is effected by using a reflux cooler, on which volatile constituents are condensed. After cooling the mixture to about 30° C., 50 ml isopropanol and 500 ml heptane are added one after the other. This solution is then diluted with heptane or cyclohexane, until it has a dry matter concentration of 4 to 8 wt-%. The solution is sprayed onto a glass plate. Upon evaporation of the solvent, the glass plate bears a thin film which consists of cured resin, is hydrophobic and firmly adheres to the glass plate.

EXAMPLE 2

In a reactor, there are 60 g of a polysiloxane with a relative molar mass of 950, which consists of hydrogen methyl siloxane and dimethyl siloxane units. This copolymeric polysiloxane is mixed with 60 g of a second copolymeric polysiloxane, which consists of hydrogen methyl siloxane and methyl octyl siloxane units and has a relative molar mass of 4250. Subsequently, 25 g diphenyl dimethoxysilane and 180 g octyl trimethoxysilane are added. Then, 15 g chlorosulfuric acid are added. The mixture is prepared by stirring at 20 to 25° C., and is heated to 40° C. under constant stirring. The volatile constituents released upon heating are discharged from the reactor. Upon cooling the mixture to about 30° C., 50 ml isopropanol and 500 ml heptane are added one after the other. Then, there is effected a further dilution with heptane or cyclohexane to a dry matter concentration of 4 to 8 wt-%.

The dilute solution was sprayed onto a glass plate, and an abrasion-resistant, hydrophobic film of the resin was formed. The mixture, which merely contained 50 ml isopropanol and 500 ml heptane, was coated onto a glass plate. The film thus prepared also had a good adherence on the glass plate.

EXAMPLE 3

200 g hydrogen methyl polysiloxane with a relative molar mass of 2000 were mixed with 300 g phenyl trimethoxysilane, 30 g dimethyl diethoxysilane and 25 g diphenyl dimethoxysilane and 200 g octyl trimethoxysilane. Subsequently, 56 g trichloroacetic acid were added. This mixture was heated to 50° C. under constant stirring and held at this temperature for 10 minutes. Volatile constituents were condensed on a reflux cooler. Upon cooling the mixture to 30° C., 50 ml isopropanol and 500 ml heptane were added one after the other. Then, the mixture was diluted with heptane or cyclohexane to a dry matter concentration of 4 to 8 wt-%.

The mixture, which merely contained 50 ml isopropanol and 500 ml heptane, was coated onto a glass plate. There was formed a film, which upon drying had a good adherence and was hydrophobic. The mixture, which had a dry matter concentration of 4 to 8 wt-%, was sprayed onto a glass plate. Upon drying, a cured, hydrophobic film was obtained, which had a very good adherence.

EXAMPLE 4

20 g hydrogen methyl polysiloxane with a relative molar mass of 2000 and 80 g of a cyclopentasiloxane, which consists of 5 dimethyl siloxane units and has a relative molar mass of 300, were mixed with 100 g phenyl triacetoxysilane and 200 g octyl trimethoxysilane. Then, 30 g trichloroacetic acid were added. The mixture was heated to 65° C. under constant stirring and held at this temperature for 10 minutes. Volatile constituents released upon heating were condensed by means of a reflux cooler. After cooling the mixture to 35° C., 20 g 1-1-3-3-tetramethyl-1-3-diethoxysilane, 20 ml isopropanol and 500 ml heptane were added. Then, there was effected a further dilution of the mixture with heptane or cyclohexane to a dry matter concentration of 4 to 8 wt-%. Both the mixture which contained 20 ml isopropanol and 500 ml heptane and the mix which had a dry matter concentration of 4 to 8 wt-% could be applied to a glass plate by coating or spraying, where upon drying a film was obtained which had a good adherence on the glass plate, was hydrophobic and did not change even after a repeated treatment with an alkaline detergent.

When using heptane and cyclohexane as solvent, the same properties were achieved in each case for the surface coating.

The dry matter concentration of the dilute solutions was determined by evaporating the solvent at 100° C. until the weight of the residue was constant.

I claim:

1. Mixture for treating substrates containing silicon compounds, in particular glass or ceramic material, which consists of the following components:

a) of component A, which is formed by at least one polysiloxane, which contains Si—H-bonds and has the general formula

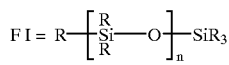

-continued
   or

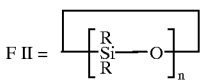

where R is an alkyl residue with 1 to 12 carbon atoms and/or a non-substituted or substituted phenyl residue, where the residues R are in part replaced by hydrogen, and where n in formula F I is a number from 2 to 50, and in formula F II a number from 4 to 50, b) of component B, which is formed by at least one bi-, tri- or tetrafunctional silane, which has the general formula

where R' is a non-substituted or substituted alkyl residue with 1 to 12 carbon atoms, a cycloalkyl residue with 5 to 6 carbon atoms, a non-substituted or substituted phenyl residue and/or a vinyl residue, where R" is an alkoxy residue or a $CH_3COO$ residue and acts as functional residue, where the alkyl moiety of the alkoxy residue has 1 to 12 carbon atoms, and where z is a number from 0 to 2, and c) of component C, which is formed by at least one strong, anhydrous organic or inorganic acid.

2. Mixture as claimed in claim 1, which contains as bifunctional silane a dialkyl dialkoxysilane, a dicycloalkyl dialkoxysilane, a diphenyl dialkoxysilane, a dialkyl diacetoxysilane, a dicycloalkyl diacetoxysilane, a diphenyl diacetoxysilane, a vinyl methyl dialkoxysilane or a vinyl methyl diacetoxysilane.

3. Mixture as claimed in claim 2, where part of the bifunctional silane has been replaced by a disiloxane, which has the general formula

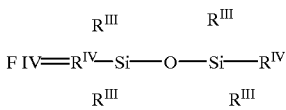

where $R^{III}$ is an alkyl residue with 1 to 12 carbon atoms, where $R^{IV}$ is an alkoxy residue, and where the alkyl moiety of the alkoxy residue has 1 to 12 carbon atoms.

4. Mixture as claimed in claim 1, which contains as trifunctional silane a monoalkyl trialkoxysilane, a monocycloalkyl trialkoxysilane, a monophenyl trialkoxysilane, a monoalkyl triacetoxysilane, a monocycloalkyl triacetoxysilane, a monophenyl triacetoxysilane, a vinyl trialkoxysilane, a vinyl triacetoxysilane or a fluoralkyl trialkoxysilane.

5. Mixture as claimed in claim 1, which contains as tetrafunctional silane a silicic acid ester of the general formula

where $R^V$ is an alkyl residue with 1 to 12 carbon atoms.

6. Mixture as claimed in claim 1, which contains as polysiloxane a linear polysiloxane with a relative molar mass of 350 to 15,000.

7. Mixture as claimed in claim 1, which contains as acid chlorosulfuric acid, benzene sulfonic acid, p-toluene sulfonic acid or trichloroacetic acid.

8. Mixture as claimed in claim 7, which contains 5 to 7 wt-% chlorosulfuric acid or 10 to 12 wt-% trichloroacetic acid.

9. Mixture as claimed in claim 1, which contains a silane with one or several vinyl residues and $FeCl_3$, $ZnCl_2$, $PtCl_6$ or $SnCl_4$ in an amount of 0.0005 to 0.01 wt-%.

10. Mixture as claimed in claim 1, which contains 2 to 4 wt-% of a lower alcohol, preferably isopropanol.

11. Mixture as claimed in claim 1, which contains a solvent consisting of at least one unpolar, liquid hydrocarbon and/or at least one ester.

12. Mixture as claimed in claim 11, which contains as solvent methyl, ethyl or butyl acetate, n-hexane, n-heptane, isooctane, cyclohexane, pentane, toluene or xylene or mixtures of these substances.

13. Mixture as claimed in claim 11, which for 1 part by weight contains 5 to 60 parts by weight of the solvent.

14. Mixture as claimed in claim 11, which for 1 part by weight contains 90 to 100 parts by weight of the solvent.

* * * * *